United States Patent [19]

Yokota et al.

[11] Patent Number: 4,845,657
[45] Date of Patent: Jul. 4, 1989

[54] CONTROLLER INTEGRATED CIRCUIT

[75] Inventors: Yoshikazu Yokota; Hiroshi Takeda, both of Kodaira, Japan

[73] Assignee: Hitachi, Ltd., Tokyo, Japan

[21] Appl. No.: 832,691

[22] Filed: Feb. 25, 1986

[30] Foreign Application Priority Data

Feb. 25, 1985 [JP] Japan .................. 60-34346

[51] Int. Cl.[4] .................. G06F 3/00; G06F 3/14
[52] U.S. Cl. .................. 364/900
[58] Field of Search ........ 364/518, 521, 200 MS File, 364/900 MS File; 340/720, 703, 750

[56] References Cited

U.S. PATENT DOCUMENTS

| 4,495,594 | 1/1985 | Eggebrecht | 364/521 |
| 4,580,230 | 4/1986 | Jones et al. | 364/521 |
| 4,583,194 | 4/1986 | Cage | 364/900 |
| 4,586,129 | 4/1986 | Murray, Jr. et al. | 364/200 |
| 4,626,839 | 12/1986 | O'Malley | 340/723 |
| 4,631,692 | 12/1986 | Broedner | 364/518 |
| 4,633,415 | 12/1986 | Vink et al. | 364/518 |
| 4,646,077 | 2/1987 | Culley | 340/723 |
| 4,660,155 | 4/1987 | Thaden et al. | 364/200 |
| 4,673,930 | 6/1987 | Bujalski et al. | 340/703 |
| 4,679,027 | 7/1987 | Higuchi | 340/723 |
| 4,745,581 | 5/1988 | Sato et al. | 365/189 |

FOREIGN PATENT DOCUMENTS

| 0019029 | 2/1977 | Japan | 340/750 |
| 2169176 | 7/1986 | United Kingdom | 340/750 |

OTHER PUBLICATIONS

Gerry Kane, "The CRT controller Handbook," 1980, pp. 1-2-3, 2-5, 2-7, 2-15, 3-7, 4-7, 5-5, 5-15, 5-17, 6-7.

Primary Examiner—Gareth D. Shaw
Assistant Examiner—Viet Q. Nguyen
Attorney, Agent, or Firm—Antonelli, Terry & Wands

[57] ABSTRACT

A controller integrated circuit, such as a cathode ray tube controller, constituting a part of a microcomputer system comprises a plurality of internal registers, a designating register to which data designating at least one of the internal registers is set, a selection circuit selecting one of the internal registers by the data of the designating register, a first external terminal to which the data of the register selected by the selection circuit is supplied, and a second external terminal to which a timing signal representing the timing of the data supplied to the first external terminal is supplied. According to this circuit construction, the data inside the controller integrated circuit can be easily referred to be the control of the first register and by use of the first and second external terminals.

21 Claims, 4 Drawing Sheets

CONTROLLER INTEGRATED CIRCUIT

BACKGROUND OF THE INVENTION

This invention relates generally to semiconductor integrated circuit techniques, and more particularly to a technique which is effectively utilized for LSI (Large Scale Integrated Circuits) for controlling peripheral units of a microcomputer, such as a CRT (cathode ray tube) controller.

CRT controllers, DMA (direct memory access) controllers, disc controllers, and the like, are known as controller LSIs for controlling peripheral units constituting a microcomputer system, such as CRT displays, floppy disks, and so forth. In order to detect the content of an internal register or status data in such a controller LSI, it has been necessary in a system using the conventional controller LSI to first examine the status of the LSI by means of a microprocessor or to confirm whether or not the LSI is in a state where it is accessible by the microprocessor, and then to read the register content or the status data in that LSI by means of the microprocessor. Therefore, a waiting state occurs in the system and hence bus efficiency drops.

FIG. 4 of the accompanying drawings is a block diagram of a system using a conventional controller LSI. When it is desired to use the content of an internal register or an internal signal for control outside of a controller LSI 10, a sub-control circuit 13' which latches desired data or signals and generates a control signal for control equipment 15 on the basis of the latched content, as well as a timing generation circuit 14 which decides the latch timing at the sub-control circuit 13' and data output timing for the microprocessor and other devices, have been necessary. In this case, a problem develops in that external circuits of the controller LSI become complicated in construction.

For details of the CRT controller and the DMA controller, refer to the following literatures, respectively:

"Nikkei Electronics" May 21, 1984, No. 343, pp. 222-254 published by Nikkei-McGraw Hill Co.

"Nikkei Electronics" Aug. 2, 1982, No. 296, pp 129-158 published by Nikkei-McGraw Hill Co.

SUMMARY OF THE INVENTION

It is an object of the present invention to provide a controller LSI capable of improving the bus efficiency of a microcomputer system.

It is another object of the present invention to provide a technique which can determine the content of registers and the internal status inside a controller LSI without the need for any complicated external circuits or without relying upon special software for this purpose.

These and other objects and novel features of the present invention will become more apparent from the following description taken in conjunction with the accompanying drawings.

Among the inventions disclosed herein, the following is a summary of a typical example.

In a controller LSI, there in newly provided, a register for designating a register whose content must be referred to and a buffer for taking thereinto and holding therein the content of the register to be referred to or suitable internal signals, and the content of the designated register is taken into the buffer circuit and outputted to outside during such a period which does not affect the control of an external system, that is, during the period in which the controller LSI does not use a bus, by use of the suitable internal signal. At the same time, the suitable internal signal is outputted outside the LSI as a signal representing a load timing. According to this circuit arrangement, the microprocessor can detect the content of a register in the controller LSI without making access thereto, and the internal status that the conventional technique has not been able to know can now be determined. In addition, external circuits which make it possible to know the internal status can also be simplified.

DESCRIPTION OF THE PREFERRED EMBODIMENTS

Figure 1:
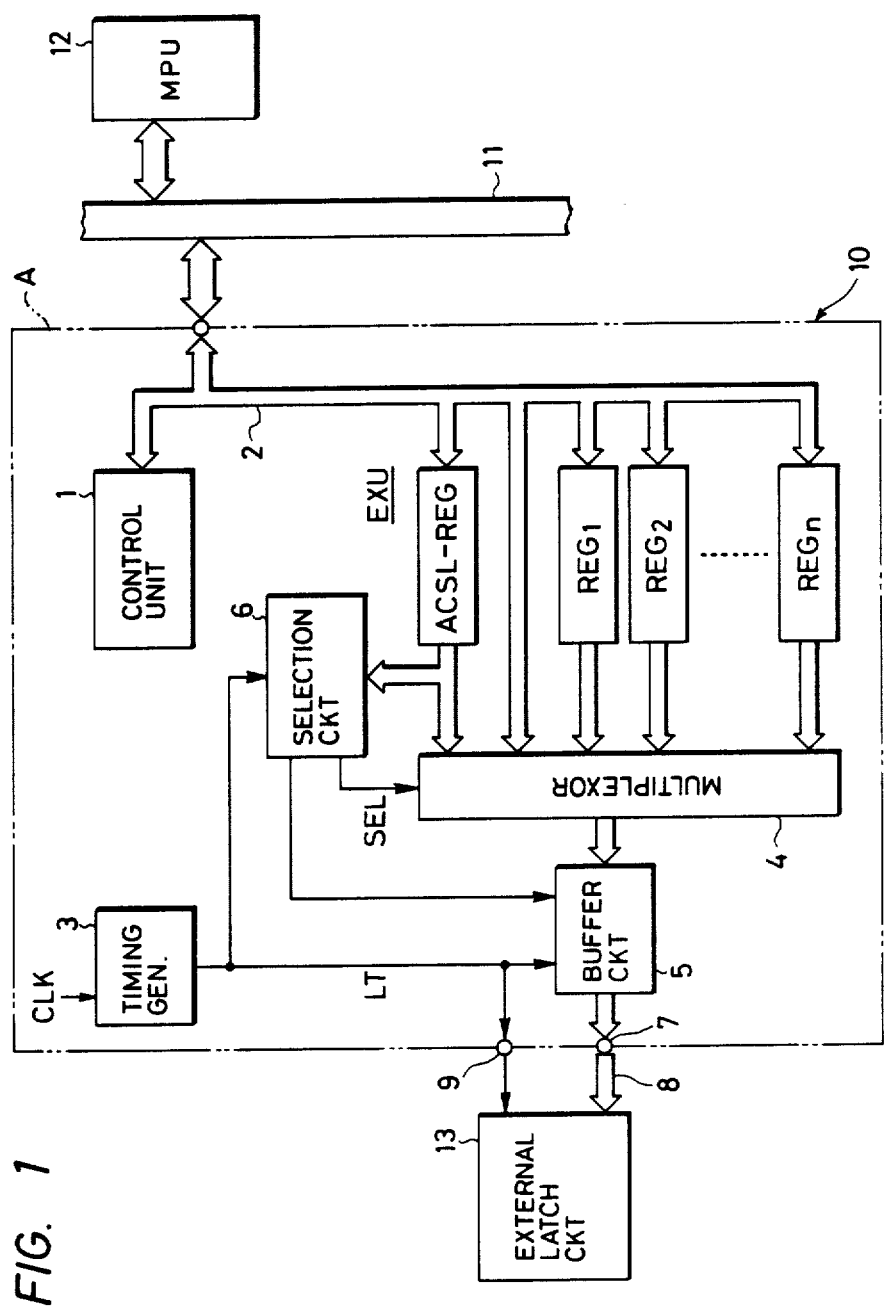
FIG. 1 is a block diagram of a controller LSI in accordance with one embodiment of the present invention.

FIG. 1 is a block diagram showing an example of a controller LSI to which the present invention is applied. In the drawing, each circuit block encompassed by one-dot-chain line A is formed on one semiconductor substrate (chip) such as a single crystalline silicon substrate, though it is not particularly limitative.

In the drawing, reference numeral 1 represents a control unit which decodes a command supplied from a microprocessor 12 outside the chip through a system bus 11 and controls an execution unit EXU constituting an arithmetic and logic unit (not shown) and registers $REG_1, REG_2, \ldots, REG_n$ in accordance with the sequence indicated by the command. The detailed construction of the control unit 1 itself is not directly relevant to the present invention and, hence, is not shown in the drawing. However, it comprises, for example, a micro ROM storing therein a microprogram for decoding and executing a predetermined command and a microprogram sequencer which receives the next address outputted from the micro ROM and the data from a suitable register, such as a flag register, and forms the next address to be supplied to the micro ROM.

The control unit 1 and the working registers $REG_1$-$REG_n$ are connected to one another through an internal data bus 2. Direct access to these working registers $REG_1$-$REG_n$ can be made from the external microprocessor 12, and data can be written into and read out from them by the microprocessor 12 through the internal data bus 2. Reference numeral 3 represents a timing generation circuit which forms internal timing signals on the basis of a system clock CLK.

The construction described above is the same as that of the conventional controller LSI. In this embodiment, however, the contents of the working registers $REG_1$-$REG_n$ can be loaded selectively into the buffer circuit 5 through a multiplexor 4. In addition, a designating reigster ACSL-REG which designates the working register, whose content must be known, among these working registers REG$_1$-REG$_n$ is also newly provided and this register ACSL-REG is connected to the internal bus 2.

Though not particularly limitative, the content of this designating register ACSL-REG, too, can be loaded into the buffer circuit 5 through the multiplexer 4. However, it is necessary that the microprocessor write in advance the content of the designating register ACSL-REG through the internal data bus 2.

In this embodiment, there is also provided a selection circuit 6 which takes thereinto the content of the designating register ACSL-REG on the basis of a suitable timing signal LT supplied from the timing generation circuit 3, and forms a selection signal SEL for driving the multiplexer 4 on the basis of the data thus taken into the selection circuit 6. This selection circuit 6 makes it possible to selectively load the content of the register (REG$_1$-REG$_n$, ACSL-REG) designated by the designating register ACSL-REG into the buffer circuit 5.

The buffer circuit 5 takes thereinto and holds the data supplied from the designated register which is selected by the multiplexor 4, and outputs the data to an output pin 7 in synchronism with the timing signal LT described above. Though not particularly limitative, the output pin 7 is connected to an external data bus 8 and is normally used as a data output pin.

The timing signal LT representing the output timing of the buffer circuit 5 is outputted to the output as a signal representing the load timing, through a suitable output pin 9. When the output pin 7 connected to the buffer circuit 5 is connected to the external data bus 8 as described above, the timing signal LT represents the period in which the controller does not use this external data bus 8. Since the controller itself always knows the internal status, such a signal can be generated easily by the limiting generation circuit 3. Incidentally, in a controller LSI, such as a CRT controller, a horizontal synchronizing signal formed by the controller changes in response to the use/nonuse status of the bus, and hence can be used as the timing signal LT described above.

Though not particularly limitative, the internal data bus 2 itself is also connected to the multiplexor 4 in this embodiment in order to utilize the empty time of the external data bus 8 and to output the signal on the internal data bus 2 to the output pin 7 through the multiplexor 4.

Figure 2:
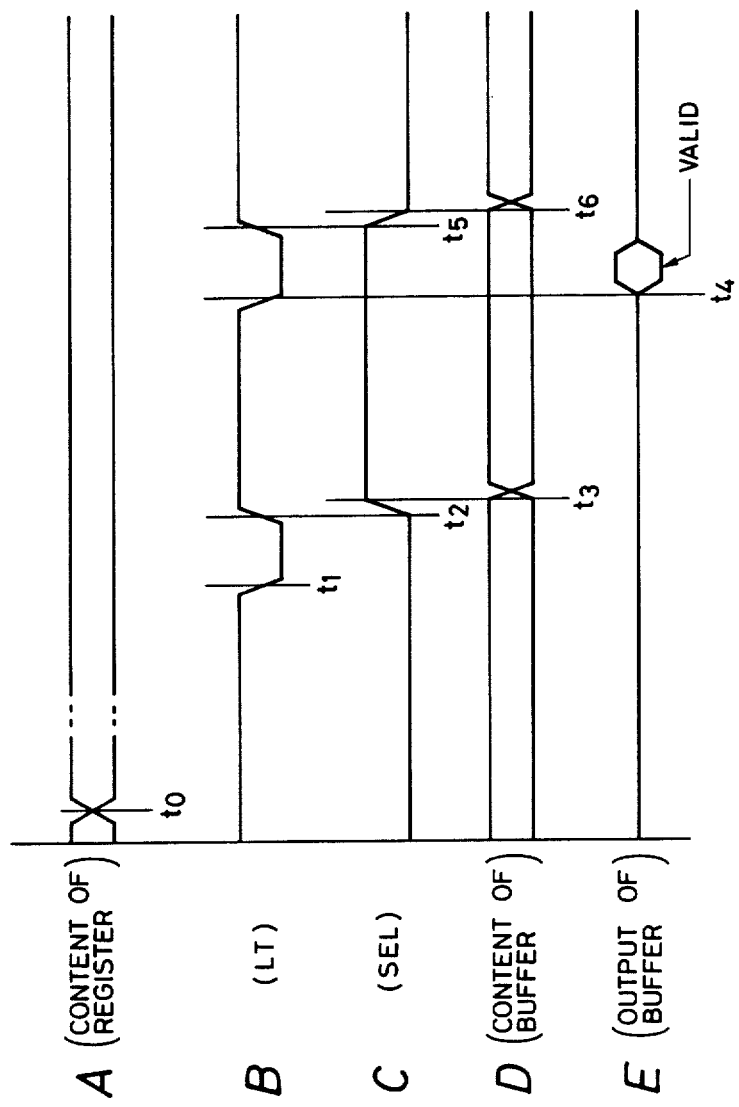
FIG. 2 is a timing chart of the controller LSI shown in FIG. 1.

FIG. 2 shows the timing at which the content of a register is outputted by the circuit of the embodiment described above.

During the period in which the timing signal LT, such as the horizontal synchronizing signal which changes in response to the status of the external bus, is at the low level, such as in a period t1-t2 in FIG. 2B, the external bus 8 is supposed to be used. In accordance with the embodiment described above, the content (the code number of the register) of the designating register ACSL-REG is taken into the selection circuit 6 in synchronism with the rise of the timing signal LT.

The selection circuit 6 generates the selection signal SEL to be supplied to the multiplexor 4 by decoding the content of the register ACSL-REG. Upon receiving this signal, the multiplexor 4 sends only the content of the designated register to the buffer circuit 5. The buffer circuit 5 holds the data sent from the multiplexor 4 in synchronism with the rise of the timing signal LT, such as at the time t2, though this is not particularly limitative, and outputs the data for a predetermined period of time at the timing at which the timing signal LT changes from the high level to the low level again such as at the time t4.

On the other hand, the timing signal LT described above is also outputted to the outside from the pin 9 as the signal representing the load timing. Therefore, the latch circuit 13 that is disposed outside takes thereinto the data on the external data bus 8 in synchronism with the fall of this timing signal LT, whereby the content of the designated register can be loaded into the external latch circuit 13. Therefore, the external control circuit including the microprocessor can immediately detect the content of a desired register by examining the content of the latch circuit 13 through the external data bus 8, whenever necessary.

In accordance with the embodiment described above, the content of the internal register can be read out by only a simple external circuit (the latch circuit 13). Moreover, since the register content can be read out without direct access to the internal register by the microprocessor, the operation speed can be improved, the load to the software can be reduced and the through-put of the system can be improved because the data is taken out by utilizing the empty time of the bus.

If the signal which is outputted to the outside in respone to the status of the external bus, such as the horizontal sync signal in the CRT controller, is used as the load timing signal LT, it is not at all necessary to provide an output pin 9 for the timing signal because a signal is to be orginally outputted from the controller. Hence, it is not at all necessary to increase the number of pins.

In the embodiment described above, the code number of one register is set into the designating register ACSL-REG so as to output the content of one designated register to the external data bus 8. However, it is possible to sequentially output to the outside the contents of a plurality of registers by setting the code numbers of a plurality of registers into the designating register ACSL-REG and decoding them sequentially by the selection circuit 6.

Figure 3:
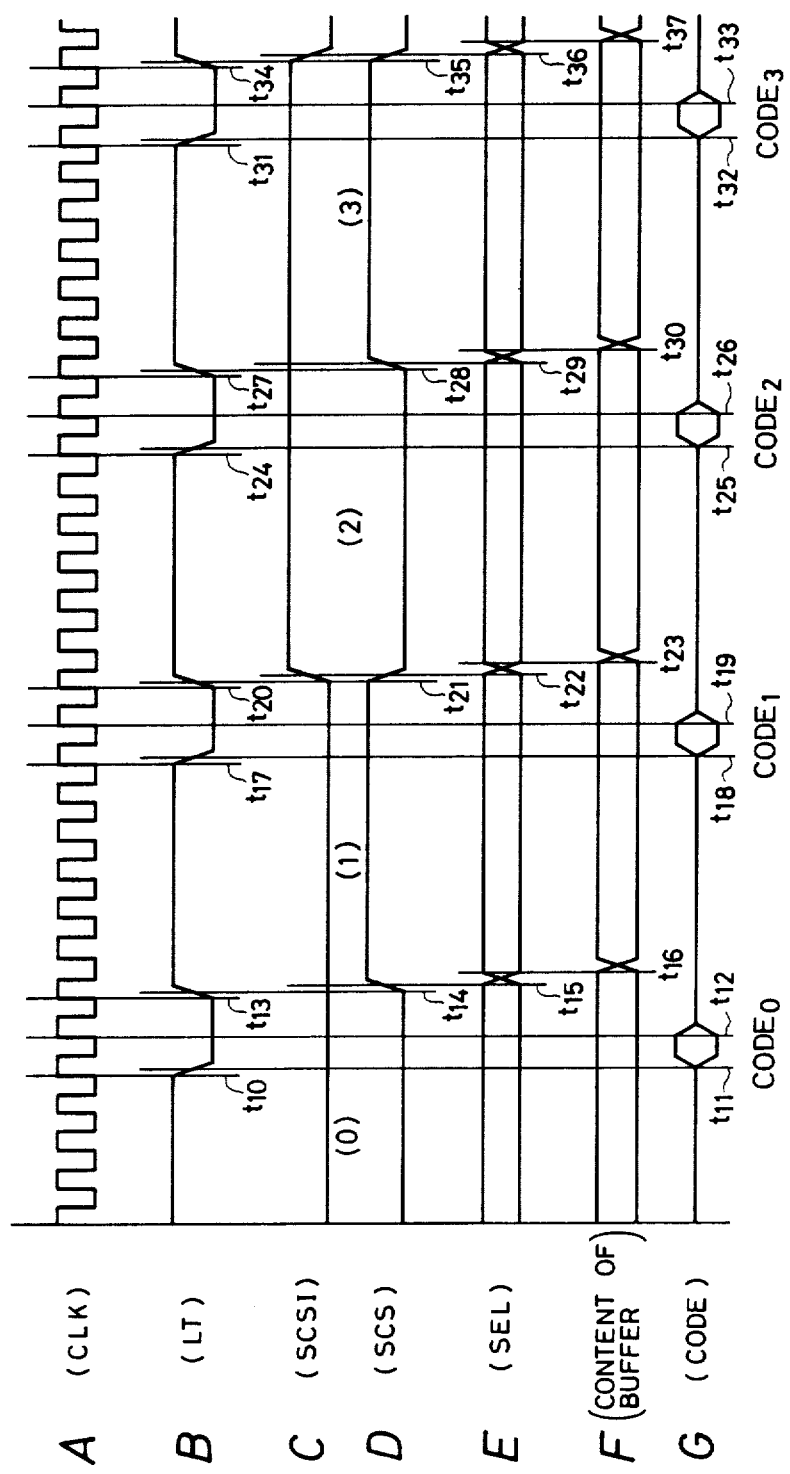
FIG. 3 is a timing chart of the case where a plurality of register codes can be set to a designating register.

FIG. 3 shows the timing of the case where the contents of four arbitrarily selected registers are read out, by way of example.

Though not particularly limitative, the selection circuit 6 includes a sequence control circuit (not shown) comprising a counter circuit which forms 2-bit sequence control signals SCS1 and SCS2 (see FIGS. 3C and 3D) to be supplied to the designating register ACSL-REG on the basis of a timing signal. Thus, the selection circuit 6 sequentially loads the four codes CODE$_0$-CODE$_3$ inside the designating register ACSL-REG thereto in synchronism with the fall of the timing signal LT.

The selection circuit 6 sequentially outputs the selection signals SEL in synchronism with the rise of the timing signal LT on the basis of the codes CODE$_0$-CODE$_3$ as shown in FIG. 3E. When the selection signal SEL changes, the multiplexor 4 is changed over in response thereto and the content of the buffer circuit 5 changes. Furthermore, the sequence control signal SCS supplied to the designating register ACSL-REG changes in synchronism with the change of the selection signal SEL, and loading of the next code is effected.

In the case described above, if the read sequence of the codes in the designating register ACSL-REG is made sequentially from the beginning as described above, the contents of the registers are outputted from the buffer circuit 5 in the predetermined sequence so that the microprocessor can detect in advance the content of which register is outputted. Incidentally, if difficult to detect from the outside the content of the register of which the code number is read out, the sequence control signal SCS may be outputted to the outside, too.

Instead of supplying the sequence control signals SCS1, SCS2 to the designating register ACSL-REG and sequentially loading the internal codes into the selection circuit 6, it is also possible to first load the content of the designating register ACSL-REG having therein the sequence control signal SCS into the selection circuit 6 and to form the selection signal SEL by sequentially decoding the four codes.

In the embodiment described above, the content of the register inside the controller LSI can be read out. Alternatively, it is possible to employ a circuit construction in which a register for designating an internal signal, a selection circuit and a buffer circuit for holding the signal of the selection circuit are disposed similarly, and a desired internal signal is outputted to the outside from a data output pin at the empty time of an external data bus.

In the controller LSI, such as the CRT controller, the number of bits of the external data bus is sometimes greater than that of the internal register. In such a case, a desired internal signal or signals can be outputted by use of excessive data output pins simultaneously with the read-out of the register content.

Furthermore, the sequence control signal SCS, too, can be outputted to the outside by use of the excessive data output pin. In such a case, there is no need at all to additionally provide the pins.

Figure 5:
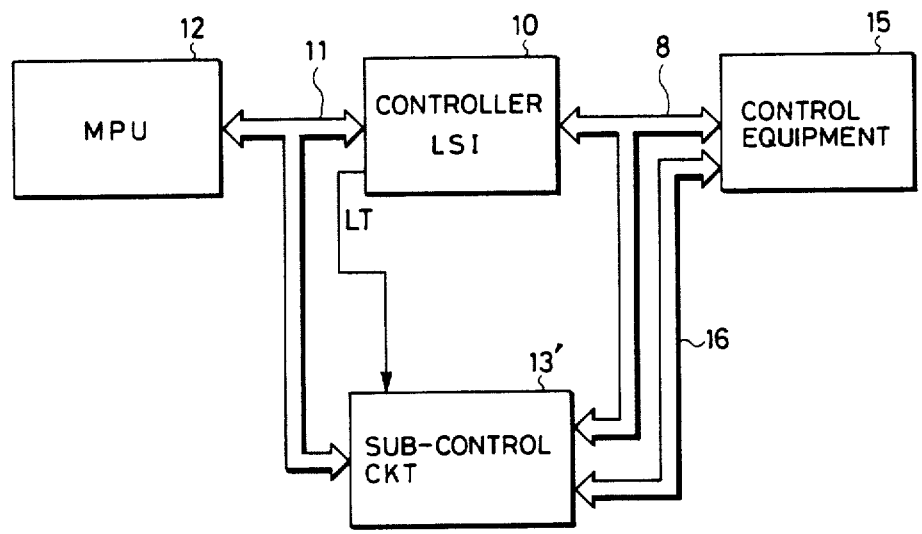
FIG. 5 is a block diagram showing an example of a system using the controller LSI in accordance with the present invention.

FIG. 5 shows an example of the construction of microcomputer systems using the controller LSI 10 such as the CRT controller in accordance with the present invention. Control equipment 15 such as a CRT display is disposed under control of the controller LSI 10 connected to the microprocessor 12 through a system bus 11. A sub-control circuit 13' comprising principally latch circuits is connected to the external bus 8 as an external circuit of the controller LSI 10.

The sub-control circuit 13' is formed by adding a circuit which generates a control signal for the control equipment 15 on the basis of the latched content to the latch circuit 13 described above.

Figure 4:
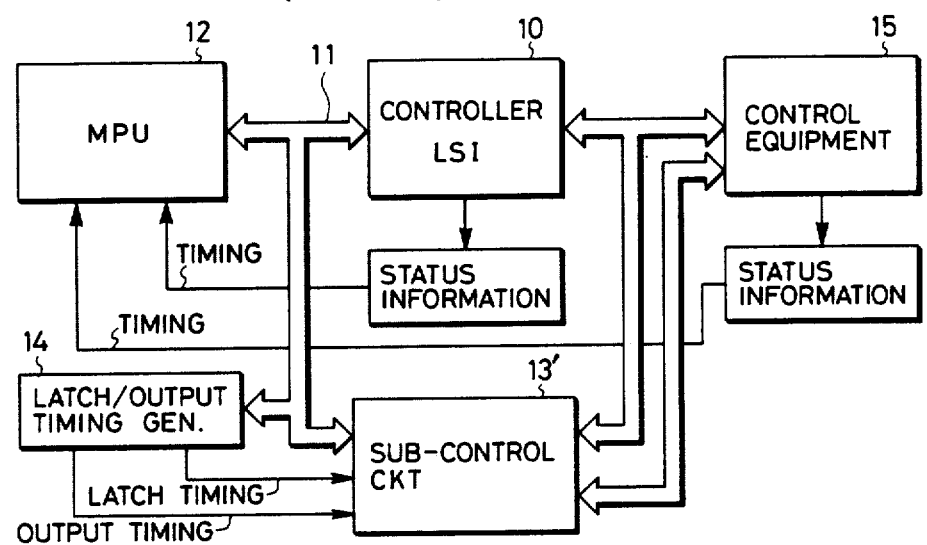
FIG. 4 is a block diagram showing an example of a system using a conventional controller LSI.

When, in the system using the conventional controller LSI, it is desired to use the content of the internal register or the internal signal at the outside, it has been necessary to use a timing generation circuit 14 which supervises the input/output status of the LSI and generates the latch timing in the external circuit 13' or data output timing of the microprocessor and other devices, in addition to the sub-control circuit 13' which latches the desired data and signals, as shown in FIG. 4.

In contrast, in the system using the controller LSI in accordance with the present invention, only the sub-control circuit 13' comprising principally the latch circuits is externally added to the controller LSI 10 as shown in FIG. 5, and this circuit arrangement makes it possible to read out the content of the internal register. Therefore, the external circuit can be simplified as compared to the prior art system. Moreover, since the register content can be read out without direct access to the register by the microprocessor, the operation speed can be improved, the load to the software can be reduced, and the through-put of the system can be improved because the empty time of the bus is utilized to take out the register content or the internal signal.

Incidentally, it is possible to connect the subcontrol circuit 13' (the latch circuit 13) to the control equipment 15 by a bus 16 so that the signal of the control equipment 15 can be latched directly by the latch circuit.

The present invention provides the following effects.

(1) The register for designating the register whose content must be referred to and the buffer for taking thereinto the content of the register to be referred to or the internal signal are newly provided in the controller LSI, the content of the designated register is taken into the buffer circuit and is outputted to the outside by use of a suitable internal signal corresponding to the period which does not affect the control of the external system, that is, the period in which the controller LSI does not use the bus, and the suitable internal signal is outputted outside the LSI as a signal representing the load timing. Therefore, the microprocessor can detect the content of the register without making access to the register in the controller LSI. Due to this operation, the bus efficiency can be improved, the through-put of the system can be improved and the load to the software can be reduced. Moreover, the present invention makes it possible to detect the internal status that has not been accomplished by the prior art technique.

(2) The register for designating the register whose content must be referred to and the buffer for taking thereinto the content of the register to be referred to or the internal signal are newly provided in the controller LSI, the content of the designated register is taken into the buffer circuit and is outputted to the outside by use of a suitable internal signal corresponding to the period which does not affect the control of the external system, that is, the period in which the controller LSI does not use the bus, and the suitable internal signal is outputted outside the LSI as a signal representing the load timing. Therefore, it is only necessary outside the LSI to latch the data of the predetermined output pin on the basis of the load timing signal, so that the external circuit necessary for reading out the register content can be simplified.

While the present invention has thus been described in its preferred embodiments, it is to be understood that various changes and modifications may be made naturally by those skilled in the art without departing from the spirit or scope of the appended claims. For instance, two or more designating registers ACSL-REGs may be provided.

It is also possible to make the desired selection by use of the addresses allotted to the registers instead of setting in advance the code numbers for designating the register to be referred to.

The present invention is not particularly limited to the controller LSIs of the microcomputer peripheral units such as the CRT controller, the DMA controller, the disk controller, and so forth, but can be used for the controlled LSIs in general including microprocessors or microcomputers.

What is claimed is:

1. A controller integrated circuit coupled to a peripheral unit in a microcomputer system having a microprocessor and to external control means for controlling said peripheral unit, comprising:
   a plurality of first registers for holding internal data;
   a selection circuit coupled to said first registers and including means for selecting one or more of said first registers and for supplying the content of each selected first register in response to a timing signal;

timing signal generating means coupled to said selection circuit for generating said timing signal independently of said microprocessor during a period of time which does not affect the control of said peripheral unit;

a first external terminal coupled to said peripheral unit and to said control means;

output means coupled between said selection circuit and said first external terminal for supplying internal data in the first registers selected by said selection circuit to said first external terminal during said period which does not affect the control of said peripheral unit; and a second external terminal connected to receive said timing signal from said timing signal generating means;

wherein said external control means is coupled to said first external terminal and to said peripheral unit and includes means for generating a control signal in accordance with the internal data supplied from said output means to control the operation of said peripheral unit.

2. A controller integrated circuit according to claim 1, wherein selection circuit further comprises a second register holding data designating at least one of said first registers.

3. A controller integrated circuit according to claim 2, wherein said first registers comprise working registers in an arithmetic and logic unit.

4. A controller integrated circuit according to claim 2 wherein the data of said second register comprises data designating a plurality of said first registers, and said selection circuit comprises means for sequentially selecting a plurality of said first registers designated by the content of said second register in synchronism with said timing signal.

5. A controller integrated circuit according to claim 2, which further comprises an internal data bus, said plurality of first registers being coupled to said internal data bus for holding internal data and said internal data bus also being coupled to said selection circuit, and wherein the data of said second register comprises data designating said internal data bus and at least one of said first registers.

6. A system including a microprocessor and a first bus coupled to said microprocessor, said system comprising
a second bus;
a peripheral unit coupled to said second bus;
a controller integrated circuit including a first external terminal coupled to said first bus and a second external terminal coupled to said second bus, wherein said controller integrated circuit includes a register, signal generating means for generating a timing signal independently of said microprocessor for indicating a time in which said second bus is available for use, output means coupled to said register, to said second external terminal and to said signal generating means and responsive to said timing signal for providing data stored in said register to said second bus during a time in which said second bus is available for use, and a third external terminal connected to receive said timing signal from said signal generating means; and
control means, coupled to said peripheral unit, to said second bus and to said third external terminal of said controller integrated circuit, for generating a control signal in accordance with data provided to said second bus from said output means to control said peripheral unit.

7. A system according to claim 6, wherein said register stores data provided to said controller integrated circuit from said microprocessor via said first bus.

8. A system according to claim 7, wherein said control means includes store means for storing data on said second bus in response to said timing signal.

9. A system according to claim 8, wherein said first bus is a different bus from said second bus.

10. A system including a microprocessor and a first bus coupled to said microprocessor, said system comprising:
a second bus;
a peripheral unit coupled to said second bus;
a controller integrated circuit including a first external terminal coupled to said first bus and a second external terminal coupled to said second bus, wherein said controller integrated circuit includes a register, signal generating means for generating a timing signal independently of said microprocessor for indicating a period which does not affect the control of said peripheral unit, output means coupled to said register, to said second external terminal and to said signal generating means and responsive to said timing signal for providing data stored in said register to said second bus during said period, and a third external terminal connected to receive said timing signal from said signal generating means; and
control means, coupled to said peripheral unit, to said second bus to said third external terminal of said controller integrated circuit, for generating a control signal in accordance with the data provided to said second bus from said output means to control said peripheral unit.

11. A system according to claim 10, wherein said register stores data provided to said controller integrated circuit from said microprocessor via said first bus.

12. A system according to claim 11, wherein said control means includes store means for storing data on said second bus in response to said timing signal.

13. A system according to claim 12, wherein said first bus is a different bus from said second bus.

14. A system including a microprocessor and a first bus coupled to said microprocessor, said system comprising:
a second bus;
a peripheral unit coupled to said second bus;
a controller integrated circuit coupled to said first bus and to said second bus, wherein said controller integrated circuit includes a plurality of data registers for holding internal data, a first register for storing data for designating at least one of said plurality of data registers holding internal data, selection means coupled to said first register for selecting at least one from said plurality of data registers in response to the stored data in said first register, timing signal generating means for generating a timing signal independently of said microprocessor for indicating time in which said second bus is available for use, and output means coupled to said selection means and to said timing signal generating means and responsive to said timing signal for providing the internal data in each selected data register to said second bus during the time said second bus is available for use; and control means, coupled to said second bus, to said peripheral unit and to said controller integrated circuit, for generating a control signal in accordance with the internal data provided to said second bus from said output means to control the operation of said peripheral unit.

15. A system according to claim 14, wherein said first bus is a different bus from said second bus.

16. A system according to claim 15, wherein said first register stores data provided to said controller integrated circuit from said microprocessor via said first bus.

17. A system according to claim 16, wherein each of said data registers stores data provided to said controller integrated circuit from said microprocessor via said first bus.

18. A system according to claim 17, wherein said selection means includes means for sequentially selecting said data registers.

19. A controller integrated circuit comprising:

a first terminal coupled to a peripheral unit and to control means for controlling said peripheral unit;

a register for holding data;

timing signal generating means for generating a timing signal for indicating a period which does not affect the control of said peripheral unit;

a second terminal coupled to said timing signal generating means for receiving said timing signal; and output means, coupled to said first terminal, to said register and to said timing signal generating means, and responsive to said timing signal for providing data stored in said register to said first terminal during the period which does not affect the control of said peripheral unit;

wherein said control means includes means for generating a control signal in accordance with the data provided from said output means to control said peripheral unit.

20. A controller integrated circuit according to claim 19, wherein said register includes a plurality of first registers, wherein said controller integrated circuit further comprises selection means coupled to said first registers and to said output means for selecting at least one of said first registers and for providing data stored in the selected first register to said output means.

21. A controller integrated circuit according to claim 20, further comprising a control register which stores data for designating at least one of said first registers.

* * * * *